United States Patent [19]

Lüdtke et al.

[11] Patent Number: 5,540,310

[45] Date of Patent: Jul. 30, 1996

[54] HOLD-DOWN DEVICE FOR A BRAKE SHOE IN A DRUM BRAKE

[75] Inventors: Peter Lüdtke, Remagen; Hermann Brix, Boppard, both of Germany

[73] Assignee: Lucas Industries public limited company, Birmingham, United Kingdom

[21] Appl. No.: 424,434

[22] Filed: May 3, 1995

[30] Foreign Application Priority Data

Jan. 14, 1993 [DE] Germany ............... 93 00 423.0 U

[51] Int. Cl.⁶ .................................................. F16D 65/08
[52] U.S. Cl. .................................................. 188/340
[58] Field of Search ................................. 188/340, 341

[56] References Cited

U.S. PATENT DOCUMENTS 2,263,949  11/1941  Harle ........................ 188/340
4,623,050  11/1986  Copp ........................ 188/340

FOREIGN PATENT DOCUMENTS

2410940  8/1979  France ........................ 188/340
899061   6/1962  United Kingdom .
2205909  12/1988 United Kingdom .

*Primary Examiner*—Josie Ballato
*Attorney, Agent, or Firm*—Oblon, Spivak, McClelland, Maier, & Neustadt

[57] ABSTRACT

A brake shoe (12) is guided on an anchor plate (10) of a drum brake and held down by a pin (32) which extends through a hole (34, 36) each in the anchor plate and in a web (18) of the brake shoe (12). The pin (32) has a foot (38) which is supported on the anchor plate (10) and a head (42) which has a bottom of rotationally symmetrical configuration with respect to the pin (32) and rises radially outwardly. Between the head (42) and the web (18) a spring (46) is arranged which has a receiving portion (50) formed with a recessed seat (52) for the head (42) and with a slot (60) which serves for radially slipping the receiving portion (50) on to the pin (32). The seat (52) is shaped like a funnel having a circular upper edge (54). The slot (60) is defined by a pair of outer edges (62) and a pair of adjoining inner edges (64). The outer edges (62) of the slot (60) converge in the direction of the upper edge (54) of the seat (52). This configuration of the hold-down device facilitates assembly of the brake shoe (12) and reduces the risk of faulty assembly.

7 Claims, 7 Drawing Sheets

HOLD-DOWN DEVICE FOR A BRAKE SHOE IN A DRUM BRAKE

BACKGROUND OF THE INVENTION

1. Field of the Invention

The invention relates to a hold-down device for a brake shoe guided on an anchor plate of a drum brake, comprising a pin which passes through a hole each in the anchor plate and in a web of the brake shoe and which includes a foot resting on the anchor plate and a head, and further comprising a spring assembly disposed between the head and the web and including a receiving portion which is formed with a recessed seat for the head and with a slot which serves for radially slipping the receiving part on to the pin and is defined by a pair of outer edges and a pair of adjoining inner edges.

2. Discussion of the Background

Such a hold-down device is known from GB-A 899 061. The head of the pin in that case is designed like a hammer head, and a C-shaped leaf spring having two limbs disposed symmetrically with respect to each other and interconnected by an apex region, while having a bent-up edge each at their respective free ends remote from the apex, presents the spring assembly. Starting from that edge, each limb rises in the direction of the apex up to a wavy elevation which is parallel to the apex; that is followed by a cylindrical depression, likewise parallel to the apex, extending transversely across the full width of the respective limb. Each of the two limbs is formed with a slot starting from the upwardly bent edge, extending at uniform width up to the depression, and terminating beyond the same in a semicircular arc. When mounting this known hold-down device, the slotted part of the limb remote from the web of the corresponding brake shoe constitutes a receiving part which by and large is pushed under the hammer head formed at the pin until the hammer head, lying transversely with respect to the slot, becomes locked in the cylindrical depression. Now, if the hammer head deviates from the transverse orientation with respect to the slot, either from the beginning or because the pin has rotated ever so slightly about its axis during assembly, it is no longer guaranteed that the mounting will be correct. The hammer head perhaps may come to a stop on the elevation and slip off in outward direction along the limb later on due to vibrations, for example. Or it may fall through the slot. In both events the C-shaped leaf spring and, therefore, the entire hold-down device become ineffective. To prevent that, the hold-down device must be mounted manually with great care and the mounting verified by an independent person, whenever possible, before the drum brake can be released for further installation.

SUMMARY OF THE INVENTION

It is the object of the invention to improve a hold-down device for a brake shoe guided on an anchor plate in a drum brake in such a way that the assembly of the hold-down device will be facilitated and the risk of faulty mounting reduced.

Starting from a hold-down device of the type specified initially, this object is met, in accordance with the invention, in that the head has a bottom which is rotationally symmetric with respect to the pin and rises radially outwardly, the seat is of funnel shape having a circular upper edge, and the outer edges of the slot converge toward the upper edge of the seat.

All that need be observed, when mounting the hold-down device according to the invention, is that the pin extends at least approximately at right angles to the web of the respective brake shoe, away from the brake shoe, and that the receiving part of the spring assembly by and large is pushed under the head of the pin, in a direction radial to the pin, until the outer edges of the slot contact the head which then slides along them until it reaches the upper edge of the funnel. Thereupon the head automatically slips into the seat in which it is securely taken up without any necessity to make sure previously that the pin and its head were in a certain angular position of rotation. If, on the other hand, the head of the pin does not get to the upper edge of the funnel, due to a mistake made in mounting, it will immediately slide along the outer edges of the slot which are diverging towards the open end of the slot and, finally, it will drop between them so that the faulty mounting becomes noticeable even without any special attention; alternatively it may be detected by a simple sensor, in case of automation.

The bottom of the head preferably is convex. That has the advantage that the head will be able to tilt in any direction, upon actuation of the drum brake, without any change worth mentioning taking place in the position of the head with respect to the funnel-shaped seat.

The seat conveniently has a lower edge of circular arc shape, concentric with its upper edge, with the slot ending at the lower edge. This means that slot extends into the receiving portion only inasmuch as that is absolutely necessary and consequently does not weaken it substantially.

It is especially advantageous if each one of the outer edges intersects the corresponding inner edge at a point which lies on the circular upper edge of the seat. In that manner the risk of faulty installation is reduced still more because, even under the most adverse conditions, the head hardly ever will have a chance to get stuck between the outer and inner edges in a kind of unstable equilibrium.

It is likewise advantageous if the receiving portion is flat around the upper area of the seat.

In addition to the features recited initially, the hold-down device according to the invention may further have in common with the hold-down device known from GB-A 899 061 that the receiving part is formed at the upper limb of a leaf spring which is bent in C shape. In this event it is convenient for the slot to start from a downwardly bent outer edge of this limb—in contrast to the known arrangement with the upward bend. Hereby, the assembly of the leaf spring bent in C shape is facilitated still more.

In the case of an alternative embodiment of the invention the receiving portion is a substantially rotationally symmetric disc which sits on a helical spring together with which it forms the spring assembly.

BRIEF DESCRIPTION OF THE DRAWINGS

Two embodiments of the invention will be explained in greater detail below, with reference to diagrammatic drawings, in which.

DESCRIPTION OF THE PREFERRED EMBODIMENTS

Figure 1:
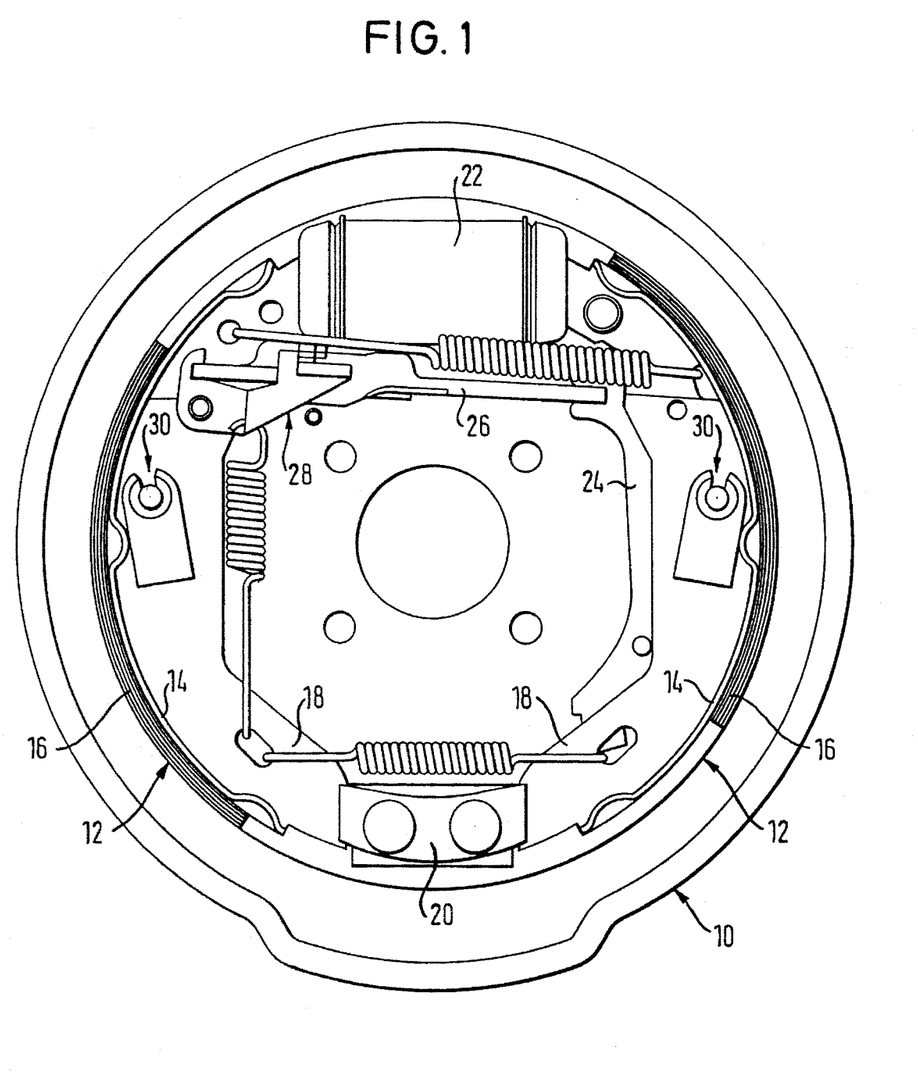
FIG. 1 is an axial view of a drum brake comprising two hold-down devices according to the invention.

The drum brake illustrated in FIG. 1 comprises an anchor plate 10 intended to be fastened on the rear axle of a motor vehicle as well as two brake shoes 12 guided on the anchor plate 10 for displacement in such manner that they can be applied against a brake drum, not shown. Each of the brake shoes 12 comprises a backplate 14 bent in circular arc shape to support a friction lining 16 which is fastened to the same, as well as a web 18 arranged parallel to the anchor plate 10 and secured to the frictioning lining backplate 14. A thrust bearing 20 is secured to the anchor plate 10 between the two brake shoes 12; and a wheel brake cylinder 22 is disposed diametrically opposite the thrust bearing. A hand brake lever 24 is supported at the right brake shoe 12, as seen in FIG. 1, to serve as the parking brake; it presses against the other brake shoe 12 via a strut 26 including an automatic adjusting device 28.

Each of the two brake shoes 12 normally is held in engagement with the anchor plate 10 by a hold-down device 30. Each of the two hold-down devices 30 comprises a pin 32 passing with radial clearance through a hole 34 in the anchor plate 10 and through a hole 36 in the web 18 of the corresponding brake shoe 12. Each of the pins 32 has a rotationally symmetric foot 38 with a spherical top abutting against the bottom surface of the anchor plate 10 and a cylindrical shaft 40 as well as a head 42 which likewise is rotationally symmetric and has a spherical bottom 44. Moreover, each hold-down device 30 comprises a spring assembly.

The above applies to both embodiments of hold-down devices 30 illustrated in FIGS. 1 to 8, on the one hand, and in FIGS. 9 to 12, on the other hand. According to FIGS. 1 to 8, the spring assembly is embodied by a C-shaped leaf spring 46 which has two limbs 48 symmetrical to each other. One end portion each of the limbs 48 is designed to be a receiving portion 50; only one or the other of these receiving portions being used as such, depending on the position upon installation, this being the upper receiving portion 50 in the case of FIGS. 3, 5, 7, and 8. For this reason, only one receiving portion 50 will be mentioned in the description below.

The receiving portion 50 has a funnel-shaped seat 52 with a circular upper edge 54 and a coaxially disposed, semicircular lower edge 56. A flat surface 58 surrounds the upper circular edge 54. A radial slot 60 starts at the free edge of the limb 48, terminating at the funnel-shaped seat 52 but not going beyond it. In its outer region, the slot 60 is defined by a pair of outer edges 62 which converge from the outside towards the inside, being located essentially in the plane of the surface 58, and ending at the circular upper edge 54 of the seat 52. Together with the funnel-like wall of the seat 52, the slot 60 furthermore defines a pair of inner edges 64 which each adjoin a respective one of the outer edges 62 at a point of intersection 66 and are parallel to each other.

At its free end, the upper limb 48 has a downwardly bent edge 68. In corresponding manner, an upwardly bent edge 68 is formed at the lower limb 48 so that full symmetry of both limbs is maintained. The two edges 68 which are bent towards each other, in the normal built-in position of the leaf spring 46 according to FIG. 3, spaced from each other. However, the leaf spring 46 can be compressed by and large until the edges 68 according to FIG. 8 will abut against each other.

Figure 2:
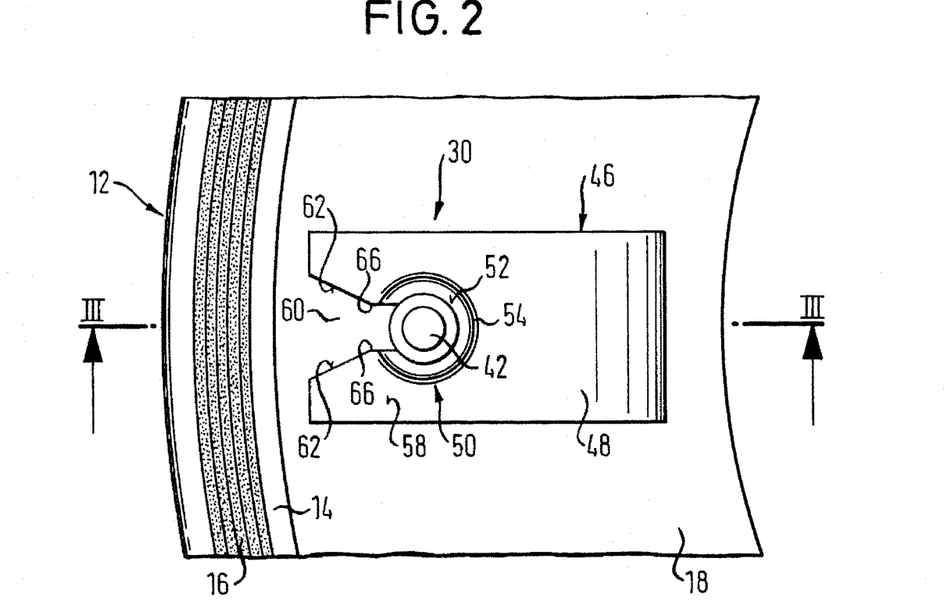
FIG. 2 is an enlarged cutout of FIG. 1 including one of the hold-down devices.
Figure 3:
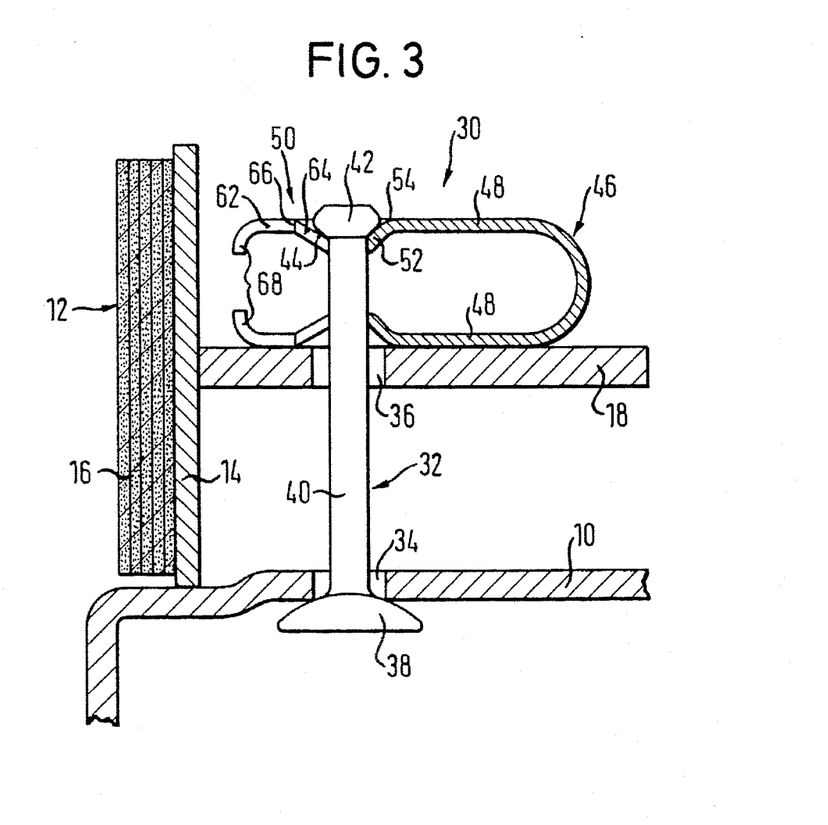
FIG. 3 shows section III—III of FIG. 2.
Figure 4:
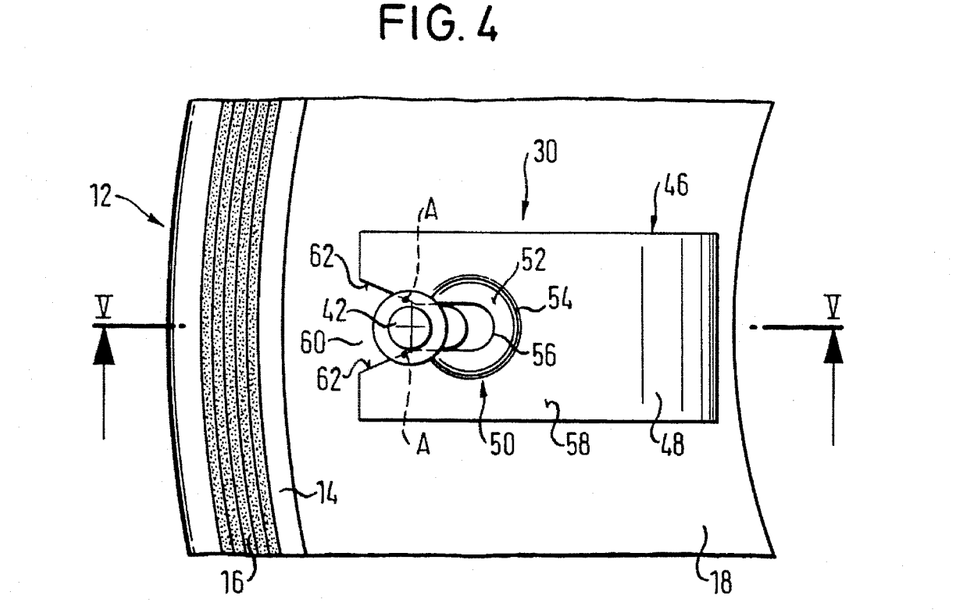
FIG. 4 is a cutout similar to FIG. 2, but showing an initial stage in the mounting of the hold-down device.
Figure 5:
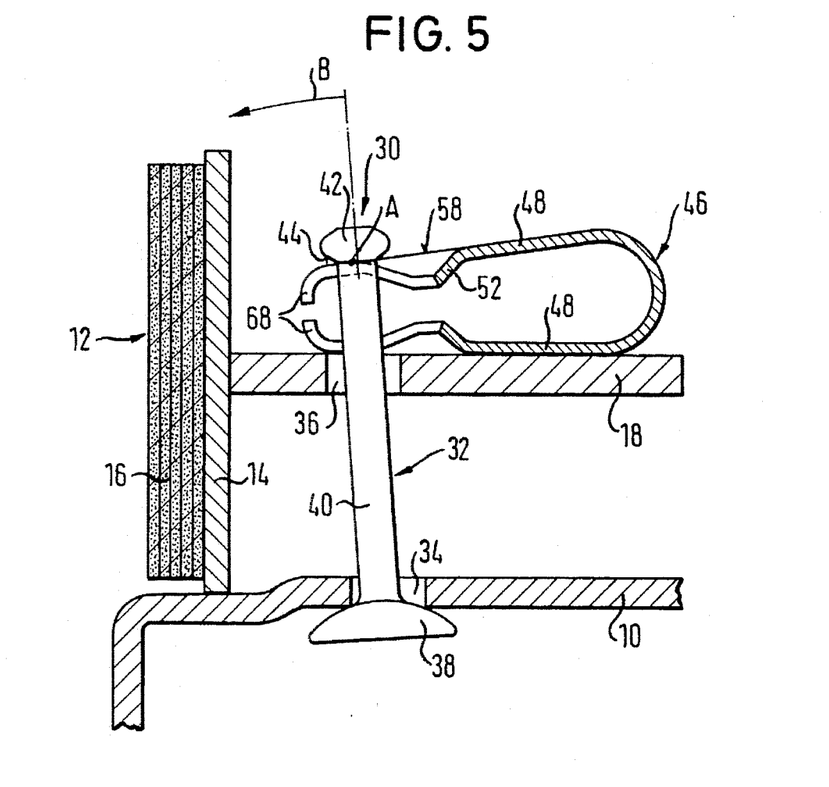
FIG. 5 shows section V—V of FIG. 4.
Figure 6:
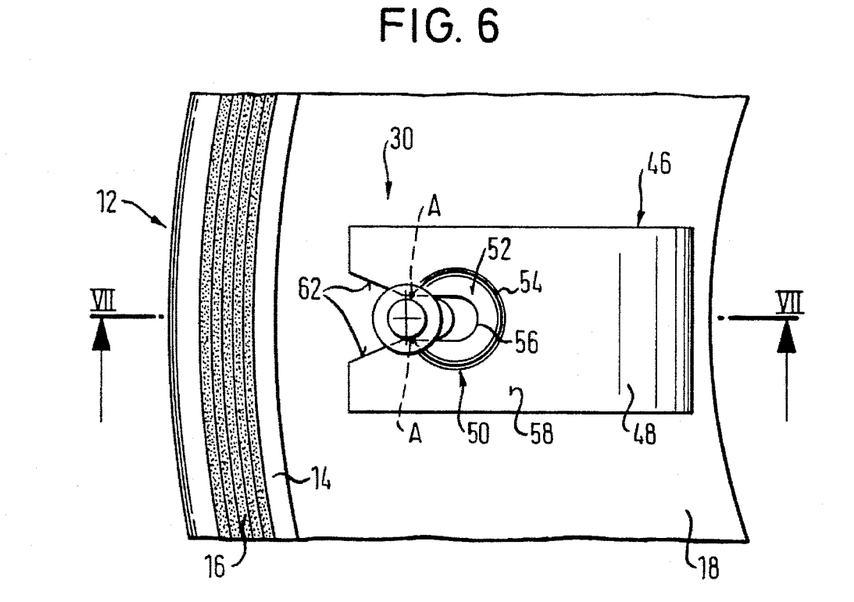
FIG. 6 is a cutout corresponding to FIGS. 2 and 4, but showing an advanced state of mounting of the hold down device.
Figure 7:
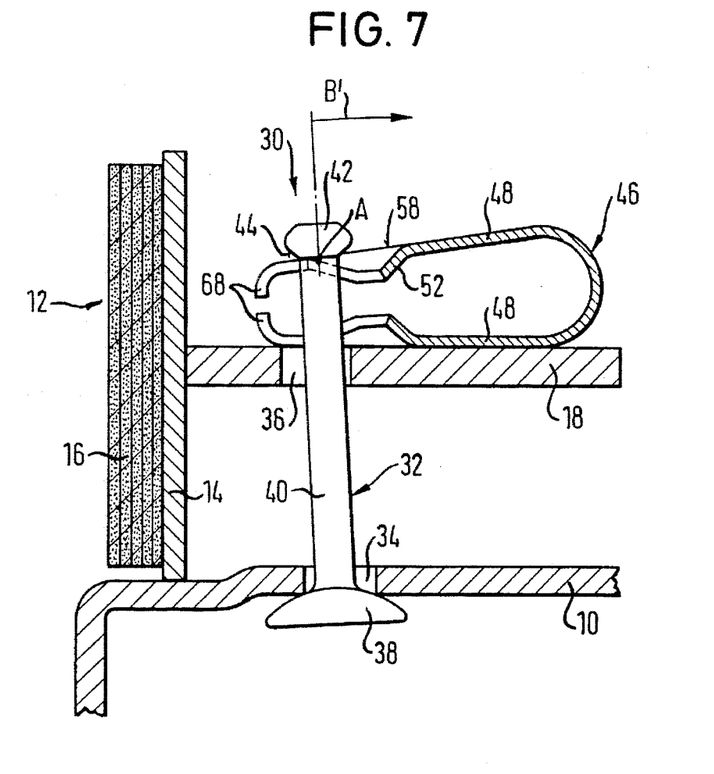
FIG. 7 shows section VII–VII of FIG. 6.

In order to obtain the built-in position of the hold-down device 30 illustrated in FIGS. 2 and 3, the leaf spring 46 is pushed, by its receiving portion 50, under the head 42 of the respective pin 32, while the shaft 40 enters into the slot 60 and the bottom 44 of the head 42 is carried on the two outer edges 62 at a point of support A each. If, for any reason, the assembling procedure is interrupted before the two points of support A coincide with a respective one of the points of intersection 66 each, a resulting force B will act on the head 42, urging the pin 32 in the direction of the open end of the slot 60 so that, finally, the head will fall through the slot. Just like it did not impede the original threading of the pin 32 into the slot 60, the downwardly bent edge 68 will not present an obstacle here.

As soon as the two points of support A each have reached a corresponding one of the points of intersection 66, the head 42 will be subjected to a force B' which causes the head 42 to slip into its lowermost position in the funnel-shaped seat 52.

Figure 8:
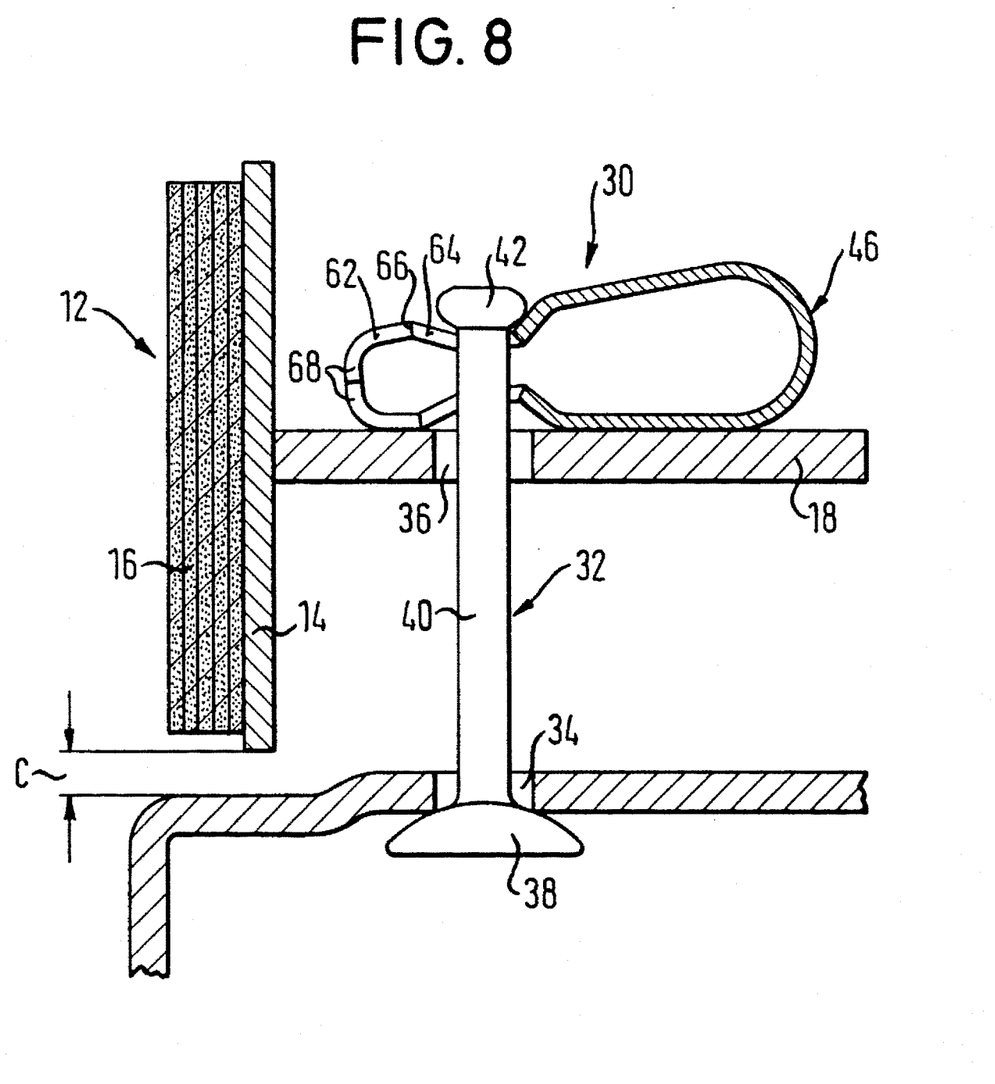
FIG. 8 is a section similar to FIG. 3, under strong loading of the hold-down device.
Figure 9:
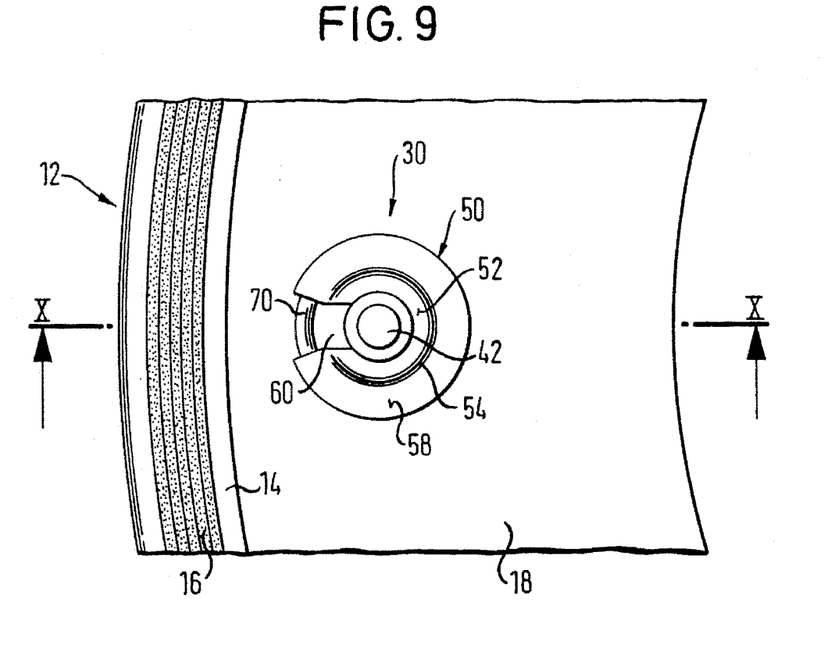
FIG. 9 is a view similar to FIG. 2, showing a different embodiment of a hold-down device according to the invention.
Figure 10:
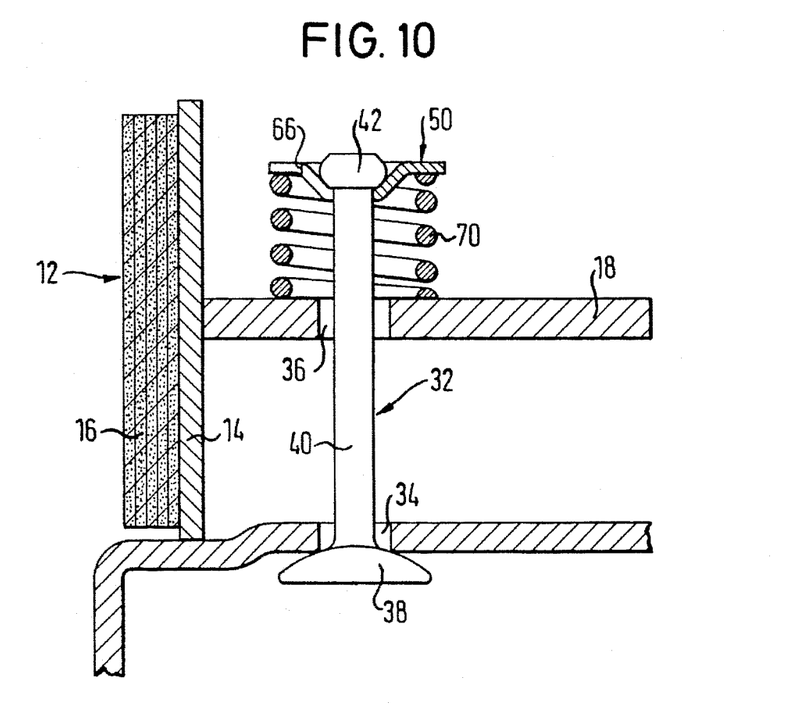
FIG. 10 shows section X—X of FIG. 9.
Figure 11:
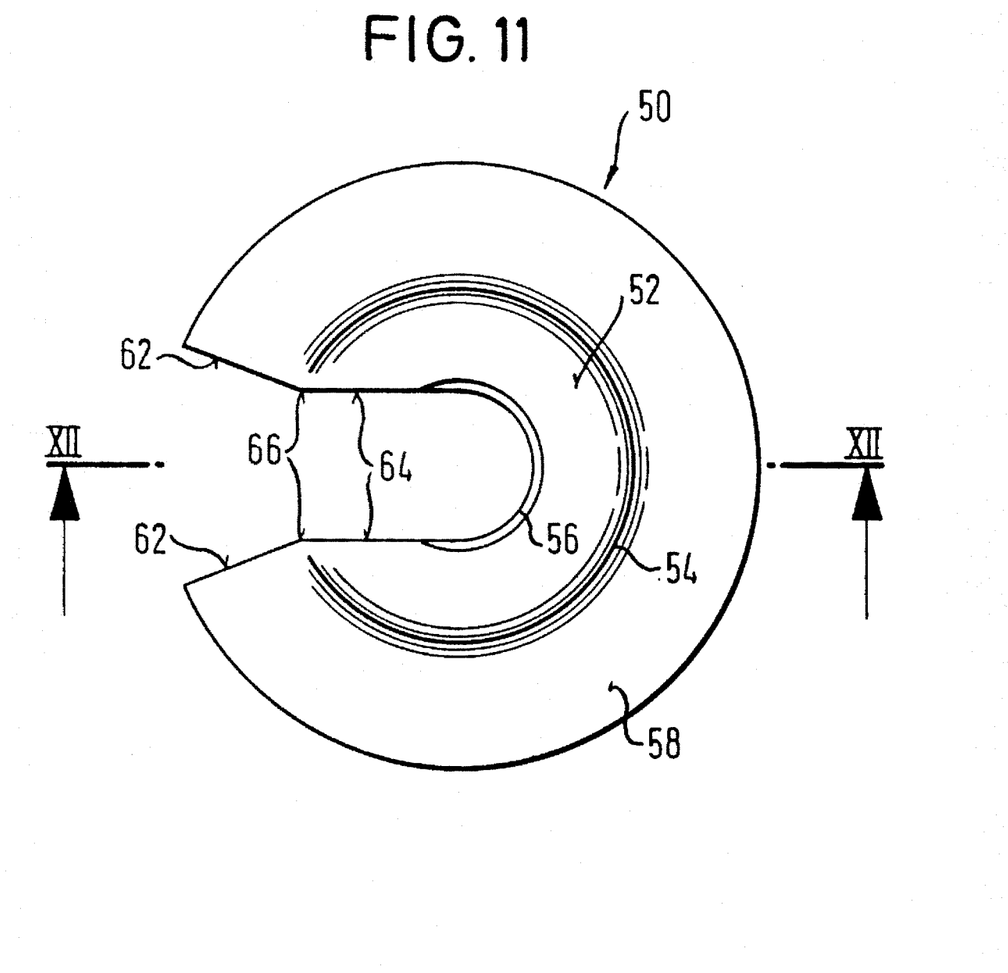
FIG. 11 shows a detail of FIG. 9, greatly enlarged.
Figure 12:
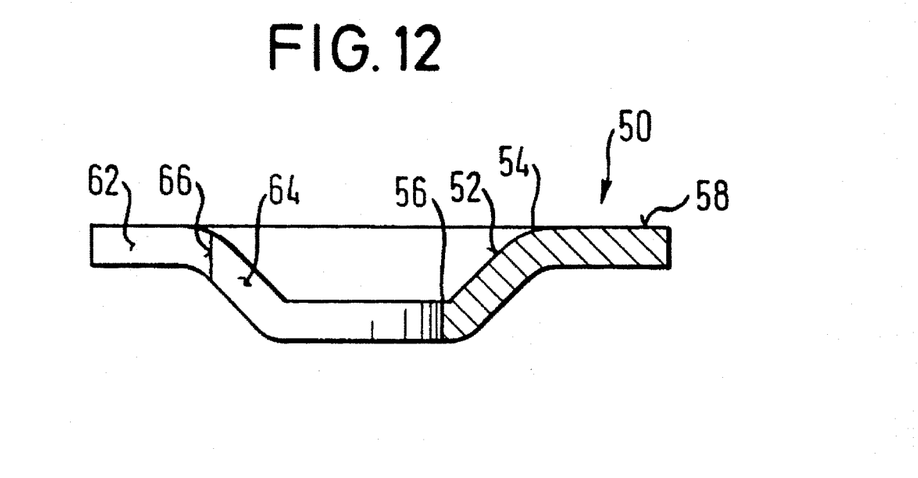
FIG. 12 shows section XII—XII of FIG. 11.

According to FIG. 8, the two free edges 68 of the leaf spring 46 which are bent towards each other determine the dimension C which is the maximum dimension by which the brake shoe 12 may be lifted off the anchor plate 10.

While the receiving portion 50 according to FIGS. 1 to 8 is formed integrally with the C-shaped leaf spring 46 so that the latter alone presents a complete spring assembly, the receiving portion 50 as shown in FIGS. 9 to 12 is a separately produced, substantially rotationally symmetric component which, together with a helical spring 70 biased in compression, forms the spring assembly. As compared to the embodiment illustrated in FIGS. 1 to 8, this spring assembly has the advantage of requiring little space all around in radial direction, with reference to the pin 32. Yet assembling it is somewhat more complicated because first the pin 32 must be pushed axially through the helical spring 70 and the spring be compressed before the dish-shaped receiving portion 50 according to FIGS. 9 to 12 can be pushed in radial direction under the head 42 of the pin 32.

The distance by which the brake shoe 12 may be urged away from the anchor plate 10 against the resistance of the helical spring 70 is determined by the sum of the distances between the individual windings of the coil of the spring and, therefore, may be fixed just as precisely as in the case of FIG. 8.

What is claimed is:

1. A hold-down device for a brake shoe (12) guided on an anchor plate (10) of a drum brake, comprising a pin (32) which passes through a hole (34, 36) each in the anchor plate (10) and in a web (18) of the brake shoe (12) and which includes a foot (38) resting on the anchor plate (10) and a head (42), further comprising a spring assembly disposed between the head (42) and the web (18) and including a receiving portion (50) which is formed with a recessed seat (52) for the head (42) and with a slot (60) which serves for radially slipping the receiving portion (50) on to the pin (32) and is defined by a pair of outer edges (62) and a pair of adjoining inner edges (64), characterized in that the head (42) has a bottom (44) which is rotationally symmetric with respect to the pin (32) and rises radially outwardly, the seat (52) is of funnel shape having a circular upper edge (54), and the outer edges (62) of the slot (60) converge toward the upper edge (54) of the seat (52).

2. The hold-down device as claimed in claim 1, characterized in that the bottom (44) of the head (42) is convex.

3. The hold-down device as claimed in claim 1, characterized in that the seat (52) has a circular-arc shaped lower edge (56) which is concentric with the upper edge (54) thereof and at which the slot (60) ends.

4. The hold-down device as claimed in claim 1, characterized in that each outer edge (62) intersects the corresponding inner edge (64) at a point (66) which is located on the circular upper edge (54) of the seat (52).

5. The hold-down device as claimed in claim 1, characterized in that the receiving portion (50) is flat around the upper edge (54) of the seat (52).

6. The hold-down device as claimed in claim 1, characterized in that the receiving portion (50) is formed in the upper limb (48) of a leaf spring (46) which is bent in C shape, and the slot (60) starts from a downwardly bent outer edge (68) of this limb (48).

7. The hold-down device as claimed in claim 1, characterized in that the receiving portion (50) is a substantially rotationally symmetric disc seated on a helical spring (70) together with which it forms the spring assembly.

* * * * *

UNITED STATES PATENT AND TRADEMARK OFFICE
CERTIFICATE OF CORRECTION

PATENT NO. : 5,540,310
DATED : July 30, 1996
INVENTOR(S) : Peter LUEDTKE, et al.

It is certified that error appears in the above-indentified patent and that said Letters Patent is hereby corrected as shown below:

On the title page, item [22] should read -- PCT filed Jan. 11, 1994

On the title page, insert items [86] and [87] as follows;

-- [86] PCT No: PCT/EP94/00059
  § 371 Dat: Jan. 11, 1994
  § 102(e) Date: Jan. 11, 1994 --

-- [87] PCT Pub. No.: WO 94/16240
  PCT Pub. Date: Jul. 21, 1994 --

Signed and Sealed this

Twenty-sixth Day of November 1996

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,540,310
DATED : July 30, 1996
INVENTOR(S) : Peter LUEDTKE, et al.

It is certified that error appears in the above-indentified patent and that said Letters Patent is hereby corrected as shown below:

On the title page, item [22] should read -- PCT filed Jan. 11, 1994

On the title page, insert items [86] and [87] as follows;

-- [86] PCT No: PCT/EP94/00059
 § 371 Dat: May 3, 1995
 § 102(e) Date: May 3, 1995 --

-- [87] PCT Pub. No.: WO 94/16240
 PCT Pub. Date: Jul. 21, 1994 --

This certificate supersedes Certificate of Correction issued November 26, 1996.

Signed and Sealed this

Eleventh Day of February, 1997

Attest:

BRUCE LEHMAN

*Attesting Officer*  *Commissioner of Patents and Trademarks*